May 27, 1930.   F. KOHLBERGER   1,760,504
TRACK FOR TRACK LAYING VEHICLES
Filed June 6, 1929   2 Sheets-Sheet 1

Inventor,
FRANK KOHLBERGER,
By his Attorneys
Redding, Greeley, O'Shea & Campbell May 27, 1930. F. KOHLBERGER 1,760,504
TRACK FOR TRACK LAYING VEHICLES
Filed June 6, 1929 2 Sheets-Sheet 2
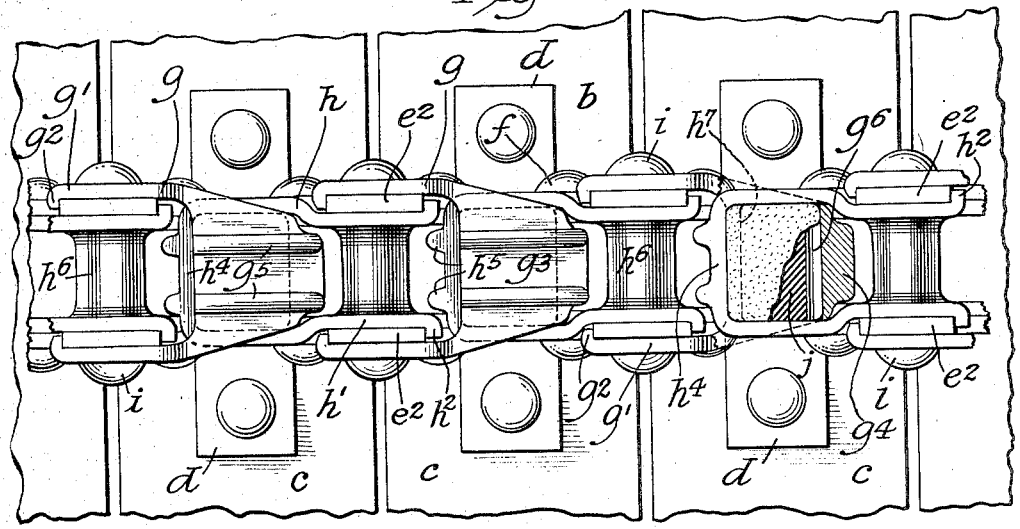
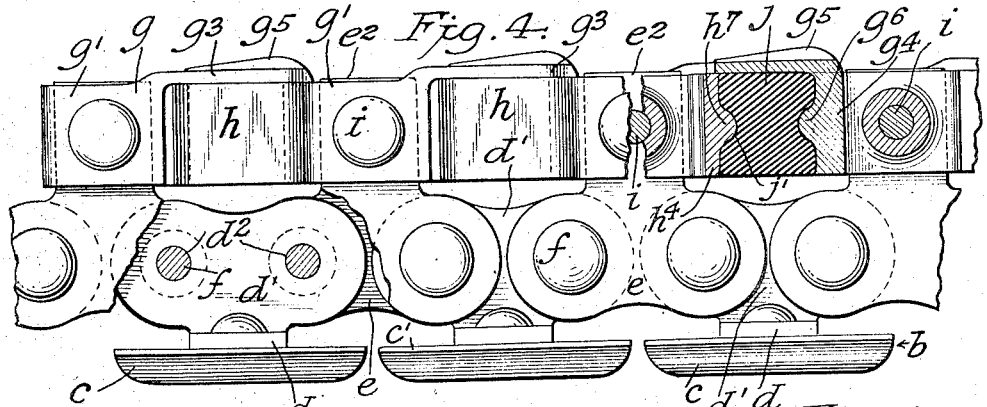
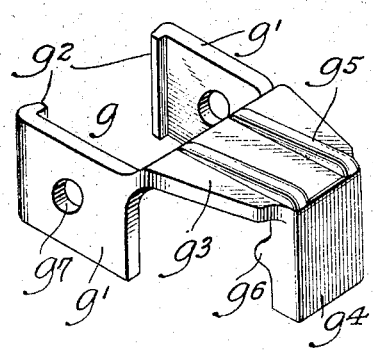 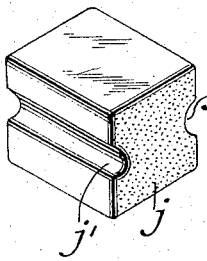 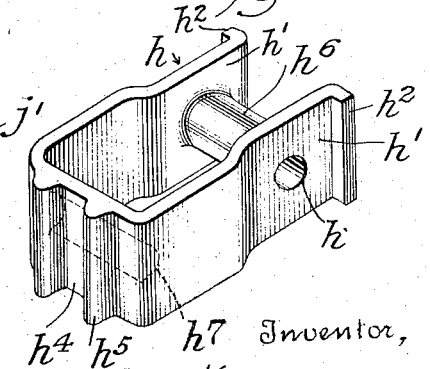
Inventor,
FRANK KOHLBERGER.
By his Attorneys.
Redding, Greeley, O'Shea & Campbell Patented May 27, 1930

1,760,504

UNITED STATES PATENT OFFICE

FRANK KOHLBERGER, OF WHITESTONE, NEW YORK, ASSIGNOR TO INTERNATIONAL MOTOR COMPANY, OF NEW YORK, N. Y., A CORPORATION OF DELAWARE

TRACK FOR TRACKLAYING VEHICLES

Application filed June 6, 1929. Serial No. 368,772.

The present invention relates to tracks for track laying vehicles and embodies, more specifically, an improved form of track for use on vehicles carrying a plurality of dual tires at one extremity thereof.

It is frequently desirable, in vehicles of the dual rear axle type, to mount a track over the wheels at each side at one end of the frame and thus increase the traction thereof. In this manner, a vehicle may be readily converted from one type to another in accordance with the conditions under which it is operated to increase, materially, the serviceability thereof.

The present invention affords a construction which is adapted to be used with vehicles of the above character upon which pneumatic tires are used. It is proposed to provide an improved form of track which is readily applied to, and removed from the vehicle wheels, the track being driven directly from the tires thereof.

An object of the invention, accordingly, is to provide a track of the above character which is simple in construction and extremely strong to withstand the severe strains during operation.

A further object of the invention is to provide a track of the above character which is highly serviceable and which requires but little attention during use.

A further object of the invention is to provide a track which will have a tendency to lie flat on the ground and will require very little lubrication.

A further object of the invention is to provide an improved track of the above character in which a considerable portion of the noise during operation is eliminated and in which the yielding of the track is cushioned in such manner that the play thereof is yieldingly resisted.

Further objects of the invention will be apparent as it is described in greater detail in connection with the accompanying drawings, wherein:

Figure 3 is an inner plan view of a portion of the track.

Figure 4 is a view in side elevation, partly broken away and in section, showing the track of Figure 3.

Figure 5 is a perspective view of one of the connecting links of the track.

Figure 6 is a perspective view of a cooperating track link.

Figure 7 is a perspective view of the cushioning element interposed between the links.

Figure 1:
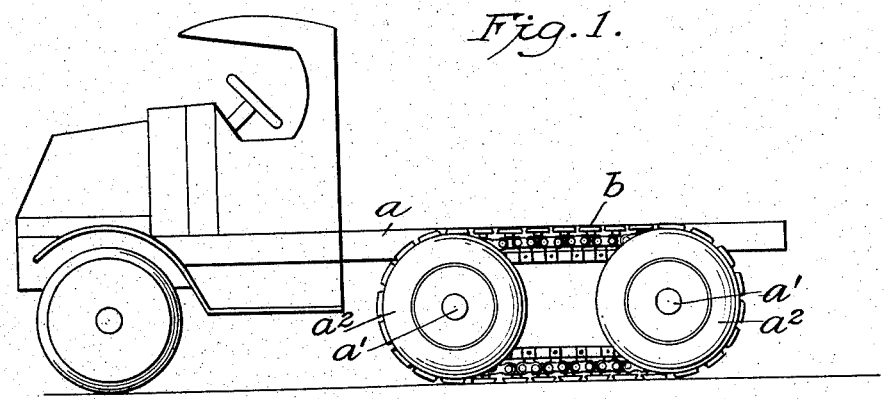
Figure 1 is a view in side elevation showing a vehicle provided with a track constructed in accordance with the present invention.
Figure 2:
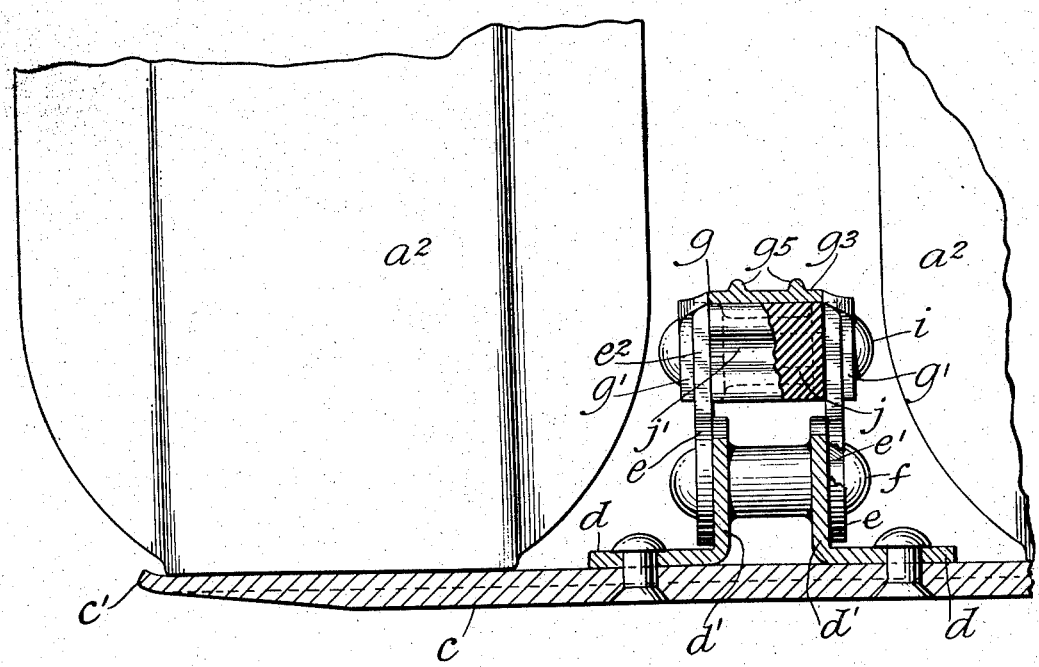
Figure 2 is an enlarged view, taken in vertical section through a track mounted upon one pair of tires, showing the manner in which the track is mounted on the tires.

Referring to the above drawings, $a$ designates the chassis of a vehicle having dual rear axles $a'$. Each axle mounts pairs of tires $a^2$ at either end thereof and a track $b$ is adapted to be mounted over the pairs of tires at either side of the chassis.

The track is formed of transverse pads $c$, having inturned outer edges $c'$ to hold the pads on the tires $a^2$. Brackets $d$ are secured to the pads and are formed with inwardly extending portions $d'$ having spaced eyes $d^2$, between which, links $e$ are connected. The links $e$ are formed with eyes $e'$ which cooperate with the eyes $d^2$ to receive connecting bolts $f$.

Extending inwardly from the links $e$, are flanges $e^2$ to which adjacent ends of castings, described hereinafter, are connected.

Between the pairs of inwardly extending flanges $e^2$, castings $g$ and $h$ are connected. Castings $g$ are formed with opposed arms $g'$, having inwardly extending tips $g^2$ for engaging the inwardly extending flanges $e^2$ on the outer portions thereof. The laterally extending arms $g'$ are united by a horizontal web $g^3$ which is formed with an outwardly extending bearing pad $g^4$. The web $g^3$ may be reenforced by ribs $g^5$. On the inner surface of the bearing pads $g^4$, transversely extending ribs $g^6$ are formed. Apertures $g^7$ are formed in the laterally extending arms to receive connecting bolts $i$.

Cooperating castings $h$ are formed with laterally extending arms $h'$ having outwardly extending tips $h^2$, the arms $h'$ and tips $h^2$ engaging the inner faces of the pairs of extending flanges $e^2$. Apertures $h^3$ are formed in the lateral arms $h'$ for receiving the connecting bolts $i$, and a reenforcing collar $h^6$ is cast integral with the casting $h$ to strengthen the construction. A transverse bearing plate $h^4$ may be formed with reenforcing ribs $h^5$ and the inner faces of the bearing plates $h^4$ are provided with transversely extending ribs $h^7$.

When the track is assembled, castings $g$ and $h$ are secured to the inwardly extending flanges $g^2$ by bolts $i$, the bearing portions $g^4$ and $h^4$ being positioned to oppose each other. Between these bearing portions, a block of yielding non-metallic material $j$, such as rubber, is mounted, the block having grooves $j'$ formed on the opposite faces thereof to be engaged by the transversely extending ribs $g^6$ and $h^7$, respectively. It will be apparent that play in the track and between the track pads will be yieldingly opposed by the blocks $j$ and the noise of the track materially reduced. The yielding nature of the track will cause it to have a tendency to lie flat on the ground and the track will require no more lubrication than is usually required for construction of this character.

While the invention has been described with specific reference to the constructions shown in the accompanying drawings, it is not to be limited, save as defined in the appended claims.

I claim as my invention:

1. An endless track for vehicles comprising a plurality of pads, means to connect the pads, extensions on the connecting means, a U-shaped and L-shaped arm secured to each extension and projecting therefrom in horizontal directions with the extremities of the L-shaped arms projecting within the oppositely extending adjacent U-shaped arms, seats on the opposed faces of such arms, and means between the seats to oppose, yieldingly, relative movement between the pads.

2. An endless track for vehicles comprising a plurality of pads, means to connect the pads, extensions on the connecting means, arms secured to the extensions, nested seats on the arms, and means between the seats to oppose, yieldingly, relative movement between the pads.

3. An endless track for vehicles comprising a plurality of pads, means to connect the pads, extensions on the connecting means, arms secured to the extensions, opposed seats on the arms, and means between the seats to oppose, yieldingly, relative movement between the pads.

This specification signed this 31st day of May A. D. 1929.

FRANK KOHLBERGER.